US010046722B2

(12) United States Patent
Chon

(10) Patent No.: US 10,046,722 B2
(45) Date of Patent: Aug. 14, 2018

(54) DISC DRIVE VEHICLE HAVING THE SAME, AND METHOD FOR CONTROLLING THE VEHICLE

(71) Applicant: Hyundai Motor Company, Seoul (KR)

(72) Inventor: Hwa Su Chon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/332,708

(22) Filed: Oct. 24, 2016

(65) Prior Publication Data

US 2017/0294205 A1 Oct. 12, 2017

(30) Foreign Application Priority Data

Apr. 8, 2016 (KR) .................. 10-2016-0043124

(51) Int. Cl.
| | |
|---|---|
| *G11B 21/08* | (2006.01) |
| *B60R 16/037* | (2006.01) |
| *G11B 17/00* | (2006.01) |
| *G11B 17/056* | (2006.01) |
| *G11B 19/10* | (2006.01) |
| *G11B 17/051* | (2006.01) |
| *G11B 19/20* | (2006.01) |
| *G11B 17/03* | (2006.01) |
| *G11B 17/035* | (2006.01) |

(52) U.S. Cl.
CPC .......... *B60R 16/037* (2013.01); *G11B 17/00* (2013.01); *G11B 17/056* (2013.01); *G11B 19/10* (2013.01); *G11B 17/03* (2013.01); *G11B 17/035* (2013.01); *G11B 17/051* (2013.01); *G11B 19/20* (2013.01)

(58) Field of Classification Search
None
See application file for complete search history.

(56) References Cited

U.S. PATENT DOCUMENTS

| | | | | | |
|---|---|---|---|---|---|
| 5,177,730 | A | * | 1/1993 | Utsugi | ............... G11B 15/10 360/137 |
| 5,917,435 | A | * | 6/1999 | Kamiya | ............. G01C 21/3688 340/988 |
| 6,163,079 | A | * | 12/2000 | Miyazaki | ................ B60R 11/02 307/10.1 |
| 7,084,932 | B1 | * | 8/2006 | Mathias | .............. B60R 11/0211 296/37.7 |
| 7,236,863 | B2 | * | 6/2007 | LaPorte | .............. B60R 11/0252 361/679.41 |
| 7,931,505 | B2 | * | 4/2011 | Howard | ................. B60R 11/02 296/24.34 |

(Continued)

FOREIGN PATENT DOCUMENTS

| | | |
|---|---|---|
| JP | 2002-248998 A | 9/2002 |
| JP | 2008-282433 A | 11/2008 |

(Continued)

OTHER PUBLICATIONS

Computer translation of JP 2002-248998 ( Sep. 3, 2002 ).*

*Primary Examiner* — Tan X Dinh

(74) *Attorney, Agent, or Firm* — Mintz Levin Cohn Ferris Glovsky and Popeo, P.C.

(57) ABSTRACT

A disc drive includes: a disc driver that plays a safely seated optical disc; and a disc mover that moves the disc driver. The disc driver and the disc mover are configured to share information of their respective states with each other.

10 Claims, 9 Drawing Sheets

(56) References Cited

U.S. PATENT DOCUMENTS

| | | | |
|---|---|---|---|
| 2003/0202781 A1* | 10/2003 | Wu | H04N 5/765 386/277 |
| 2003/0235131 A1* | 12/2003 | Kim | G11B 17/0404 720/635 |
| 2004/0062155 A1* | 4/2004 | Urushihara | G11B 17/0404 369/30.36 |
| 2004/0085485 A1* | 5/2004 | Schedivy | B60R 11/0205 348/837 |
| 2004/0101289 A1* | 5/2004 | Watanabe | B60R 11/0235 386/361 |
| 2005/0116943 A1* | 6/2005 | Wohrle | B60R 11/0235 345/211 |
| 2005/0144819 A1* | 7/2005 | Shimizu | B60K 35/00 40/491 |
| 2005/0240691 A1* | 10/2005 | Yurusov | G06F 13/4027 710/62 |
| 2006/0046778 A1* | 3/2006 | Hembree | H04B 1/082 455/557 |
| 2006/0070102 A1* | 3/2006 | Vitito | B60K 35/00 725/77 |
| 2006/0214795 A1* | 9/2006 | Kim | G08B 13/1427 340/572.1 |
| 2007/0009108 A1* | 1/2007 | Furge | H03F 3/181 381/86 |
| 2009/0274321 A1* | 11/2009 | Doppel | H03G 1/0088 381/104 |
| 2017/0064445 A1* | 3/2017 | Pierfelice | H03G 5/165 |

FOREIGN PATENT DOCUMENTS

| | | |
|---|---|---|
| JP | 2009-277327 A | 11/2009 |
| KR | 10-1997-0006190 B1 | 4/1997 |
| KR | 2008-0086606 A | 9/2008 |
| KR | 10-2011-0015951 A | 2/2011 |
| KR | 2013-0067569 A | 6/2013 |
| KR | 10-1379386 B1 | 4/2014 |

* cited by examiner

FIG. 7

|  | Bit Size | Value |
|---|---|---|
| FIRST STATE INFORMATION | 3 | 0:Default<br>1:Open<br>2:Close<br>3:Error<br>4~6:Reserved<br>7:Invalid |
| SECOND STATE INFORMATION | 3 | 0:Default<br>1:Insert_done<br>2:Loading<br>3:Error<br>4:No Disc<br>5~6:Reserved<br>7:Invalid |
| THIRD STATE INFORMATION | 4 | 0x0:Key out or Audio OFF<br>0x1:Not used<br>0x2:ACC or Audio ON<br>0x3~0xE:Not used<br>0xF:Invalid |

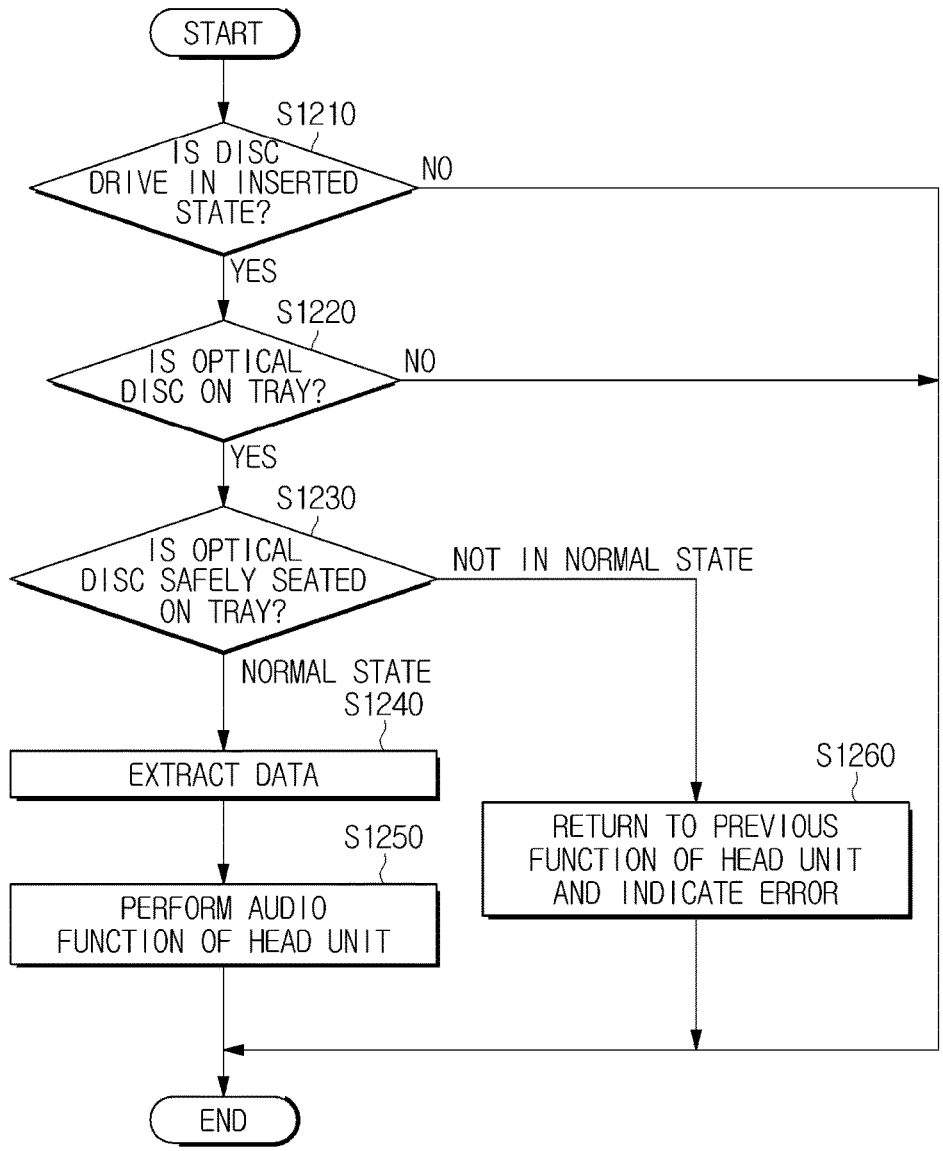

DISC DRIVE VEHICLE HAVING THE SAME, AND METHOD FOR CONTROLLING THE VEHICLE

CROSS-REFERENCE TO RELATED APPLICATION

This application claims priority to and the benefit of Korean Patent Application No. 10-2016-0043124, filed on Apr. 8, 2016, the disclosure of which is incorporated herein by reference in its entirety.

BACKGROUND

1. Field of the Disclosure

The present disclosure relates generally to vehicular technologies and, more particularly, to a disc drive, vehicle having the same, and method for controlling the vehicle.

2. Discussion of Related Art

Recent vehicles provide a wide range of user-convenient functions, such as audio playback, video playback, navigation, air conditioning (A/C) and ventilation, heated seats, communication with external devices, etc. Certain vehicles may also be equipped with a head unit or Audio Video Navigation (AVN) system in which an Audio/Video system for playing Compact Discs (CDs), Video CDs (VCDs), Digital Versatile Discs (DVDs), and the like, and a navigation system are integrated. A conventional head unit may include a disc player for playing optical discs, such as CDs or DVDs, a controller for processing audio and video signals output from the disc player, and a display for outputting data processed by the controller. Furthermore, an independent disc drive resulting from a separation of the disc player from the head unit has recently been introduced. The disc drive may receive and drive a CD or DVD and send the resultant audio and video signals to the head unit over a wired or wireless network.

SUMMARY OF THE DISCLOSURE

Accordingly, the present disclosure provides a disc drive, vehicle having the same, and method for controlling the vehicle, which shares state information to prevent errors in operation of the disc drive. The present disclosure also provides a disc drive, vehicle having the same, and method for controlling the vehicle, which shares state information to prevent damages to optical discs, such as CDs or DVDs.

In accordance with embodiments of the present disclosure, a disc drive includes: a disc driver that plays a safely seated optical disc; and a disc mover that moves the disc driver. The disc driver and the disc mover are configured to share information of their respective states with each other.

The disc driver and the disc mover may be configured to share information of their respective states with each other through a head unit of a vehicle.

The disc mover may be configured to generate first state information indicating whether the disc drive is in an inserted state or in a withdrawn state.

The disc mover may be configured to generate first state information indicating whether an error has occurred in the disc mover.

The disc driver may be configured to generate second state information indicating at least one of whether the optical disc is safely seated in the disc driver, whether data is being extracted from the safely seated optical disc, and whether the safely seated optical disc is operating normally.

The disc mover may be configured to move the disc driver up or down.

The disc mover may be configured to insert the disc driver into a dashboard of a vehicle or withdraw the disc driver out of the dashboard.

The disc mover may be connected to the head unit over a Controller Area Network (CAN) communication network.

The disc driver may be connected to the head unit over a Universal Serial Bus (USB) communication network.

The disc driver may include: a disc tray on which the optical disc is safely seated; an optical pickup unit that extracts data from the safely seated optical disc; a disc communication unit that sends information indicating a state of the safely seated optical disc or the disc driver; and a disc controller that controls respective components of the disc driver.

Furthermore, in accordance with embodiments of the present disclosure, a vehicle includes: a disc drive including a disc driver that plays a safely seated optical disc and a disc mover that moves the disc driver; and a head unit that sends first state information of the disc mover to the disc driver and sends second state information of the disc driver to the disc mover.

The first state information may include information indicating whether the disc drive is in an inserted state or in a withdrawn state.

The first state information may include information indicating whether an error has occurred in the disc mover.

The second state information may indicate at least one whether the optical disc is safely seated, whether data is being extracted from the safely seated optical disc, and whether the safely seated optical disc is operating normally.

The vehicle may further include a dashboard formed on a front portion of an interior of the vehicle. The disc mover may be configured to move the disc drive into or out of the dashboard.

The vehicle may further include a mover control switch arranged outside the disc mover. The disc mover is configured to move the disc driver according to operation of the mover control switch.

The disc mover may be connected to the head unit over a Controller Area Network (CAN) communication network, and the disc driver is connected to the head unit over a Universal Serial Bus (USB) communication network.

When the disc mover receives a withdraw command, the first state information may include information indicating that the disc drive is in the withdrawn state, and the disc driver may stop extracting data from the optical disc and enables a user to withdraw the optical disc.

When the safely seated optical disc is withdrawn, the disc driver may generate the second state information to indicate that the disc driver is empty.

Furthermore, in accordance with embodiments of the present disclosure, a method for controlling a vehicle including: receiving, at a disc mover, a withdraw command; moving, by the disc mover, a disc driver in response to the withdraw command; determining whether a disc drive including the disc mover and disc driver is in a withdrawn state, based on first state information sent from the disc mover; determining whether the disc driver is extracting data from a safely seated optical disc, when the disc drive is in the withdrawn state; and withdrawing the safely seated optical disc.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 7 is shows a table representing data included in the first to third state information;

FIG. 9 is a flowchart illustrating a method for controlling a vehicle performed in response to reception of a command from the driver to move a disc drive into a dashboard.

DETAILED DESCRIPTION OF EMBODIMENTS

Figure 1:
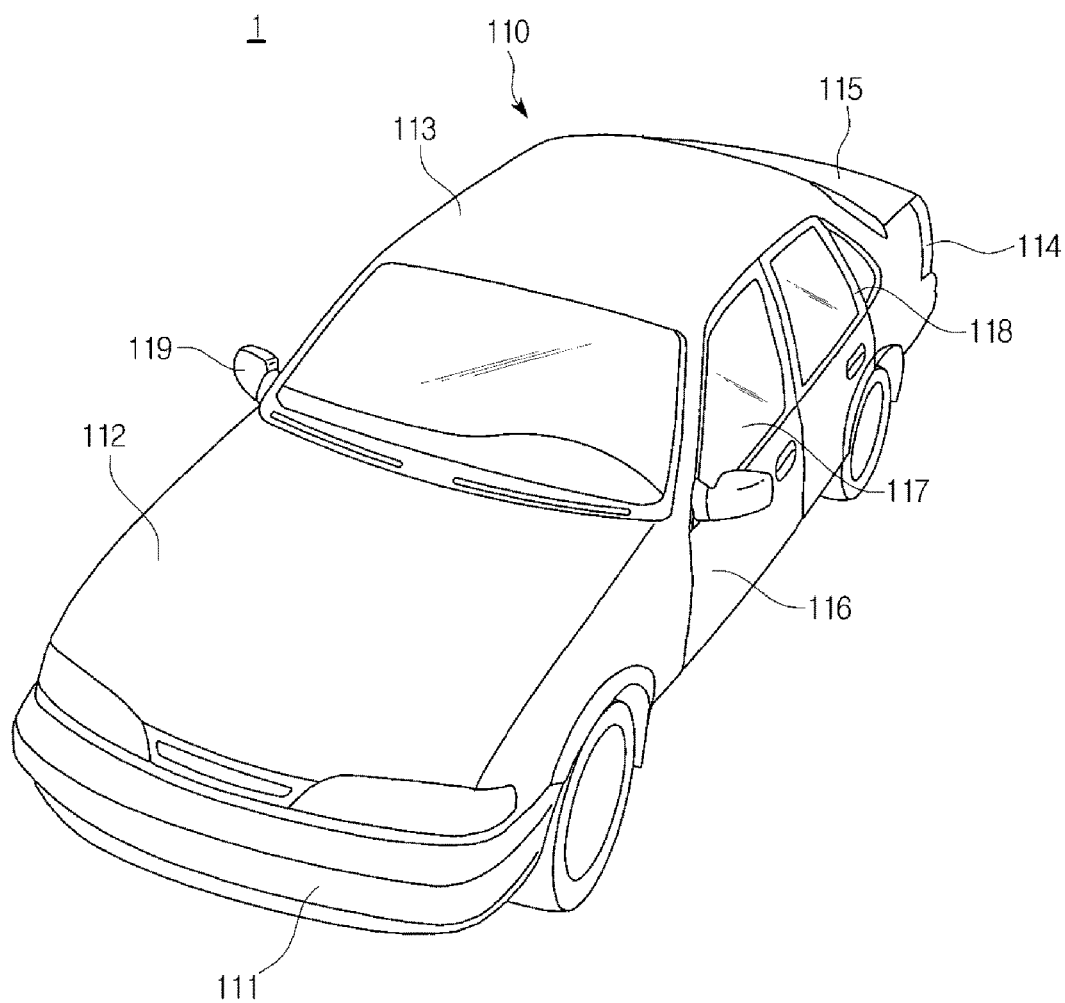
FIG. 1 shows an exterior of a vehicle, according to embodiments of the present disclosure.

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 2:
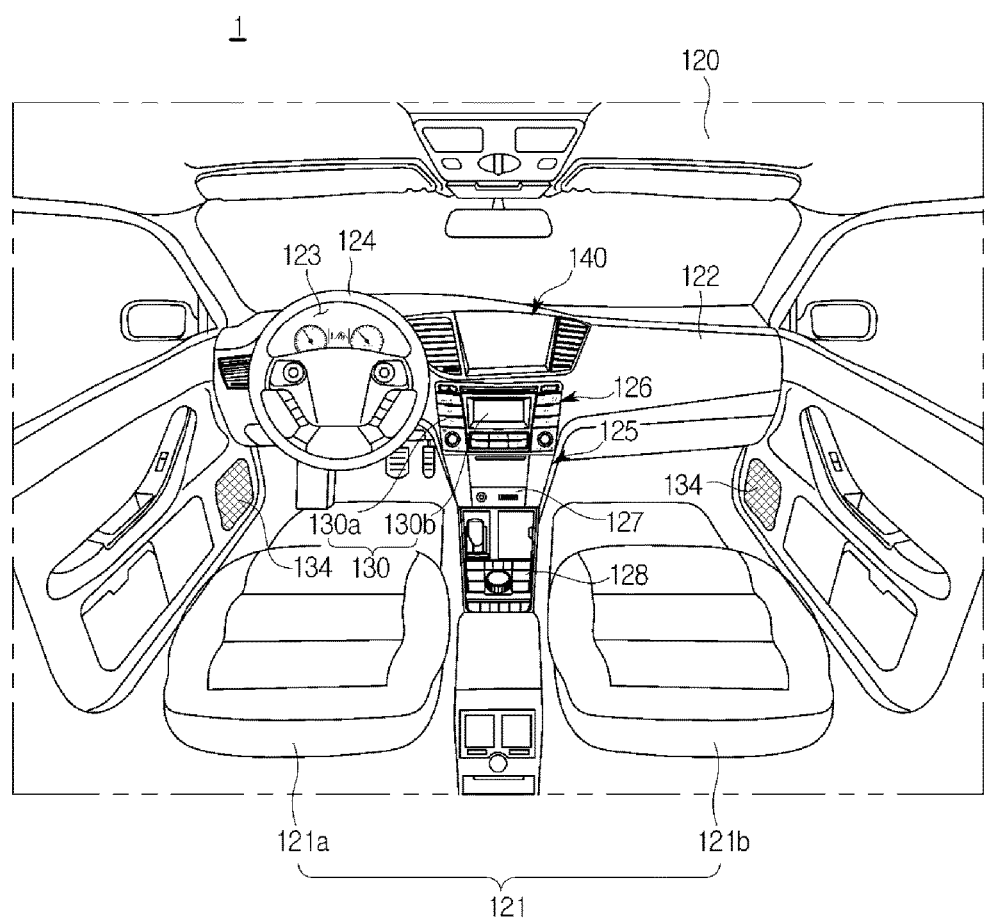
FIG. 2 shows an interior of a vehicle, according to embodiments of the present disclosure.
Figure 3:
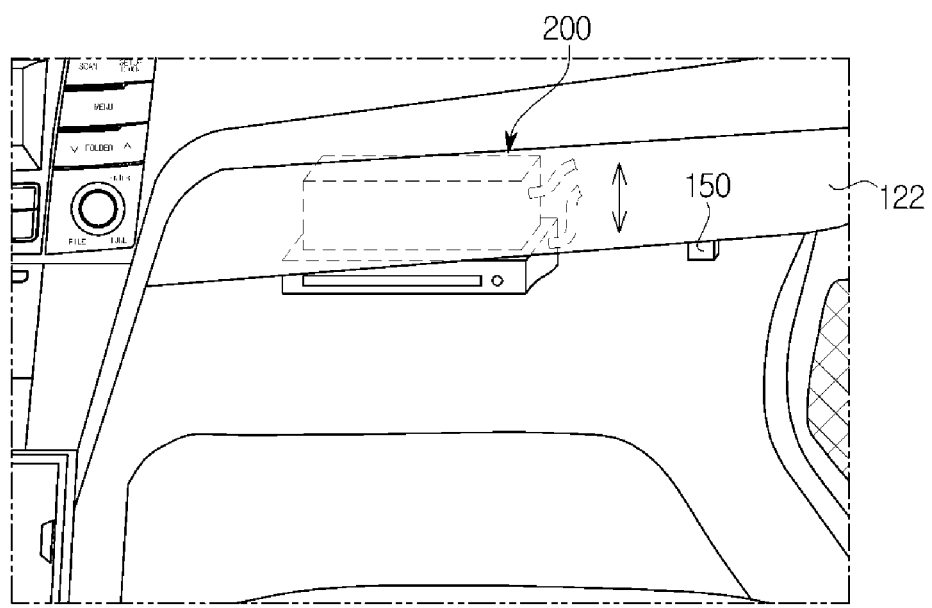
FIG. 3 is an enlarged view of a dashboard.

FIG. 1 shows an exterior of a vehicle, according to embodiments of the present disclosure, and FIG. 2 shows an interior of a vehicle, according to embodiments of the present disclosure, and FIG. 3 is an enlarged view of a dashboard.

Referring first to FIG. 1, the vehicle 1 travels on a road by driving wheels for the purpose of transportation of humans or goods, as is well understood in the art. The vehicle 1 includes a body with exterior and interior parts, and remaining parts, i.e., chassis on which mechanical devices required for driving are installed. The exterior part 110 of the body includes a front bumper 111, a hood 112, a roof panel 113, a rear bumper 114, a trunk 115, front, back, left and right doors 116, and window glasses 117 equipped in the front, back, left and right doors 116 to be opened/closed.

The exterior part 110 further includes fillers 118 arranged on the boarders between the window glasses mounted on the front, back, left and right doors 116, the front bumper 111, the hood 112, the roof panel 113, the rear bumper 114, and the trunk 115. Further, the window glasses 117 include side window glasses equipped in the front, back, left and right doors 116, quarter window glasses located between the fillers 118 not to be opened, a rear window glass installed on the back, and a front window glass installed on the front. The exterior part 110 of the body further includes side mirrors 119 that help the driver see areas behind the vehicle 1.

It should be understood that the exterior arrangement of the vehicle 1 depicted in FIG. 1 and described above is for demonstration purposes only, and thus should not be treated as limiting the scope of the present disclosure or claims.

Referring to FIG. 2, the interior part 120 of the body includes seats 121, a dashboard 122, an instrument cluster (or cluster) 123 placed on the dashboard, containing gauges and indicators, such as a tachometer, speedometer, water temperature gauge, fuel gauge, turn signal indicator, head light indicator, warning light, seat belt warning light, odometer, gearshift position indicator, door open warning light, low fuel warning light, low oil pressure warning light, etc., a steering wheel 124 for steering control of the vehicle, and a center fascia 125 having air vents of an air conditioner (A/C), a control pad, and an audio system arranged thereon.

The seats 121 include a driver seat 121a, a passenger seat 121b, and a back seat arranged in the back of the interior of the vehicle 1.

The cluster 123 may be digitally implemented. The digitally implemented cluster 123 displays vehicle information and driving information in images.

The center fascia 125 is a part of the dashboard 122, which is located between the driver seat 121a and the passenger seat 121b.

A head unit 126 for controlling the AC and heater system may be mounted on the center fascia 125. The head unit 126 may have various buttons arranged thereon to control the AC and heater system. Inside the head unit 126, a controller to control the AC and heater system may be arranged. The head unit 126 may be an Audio-Video-Navigation (AVN) 130 that performs a multimedia function, which may include an input unit 130a for receiving instructions to operate the AVN 130, and a display 130b for displaying information about the operation.

The head unit 126 may receive and output a broadcast signal. In FIG. 2, the head unit 126 is built into the center fascia 125, in which case a speaker 134 for outputting the broadcast signal from the head unit 126 may be installed on the front doors of the vehicle 1. Location of the speaker 134 illustrated in FIG. 2 is only by way of example, and it should be noted that the speaker 134 may be installed everywhere in the vehicle.

The display 130b may display information about operation of the AC and heater system as well. Air vents, a cigar jack, etc., may also be installed in the center fascia 125. There may also be a multi-terminal 127 arranged in the center fascia 125, through which a user equipment (not shown) may be wiredly connected. That is, the multi-terminal 127 may enable wired communication between the head unit 126 or the vehicle terminal 140 and the UE.

The multi-terminal 127 may include a Universal Serial Bus (USB) port, an Auxiliary (AUX) terminal, and further an SD slot. The multi-terminal 127 may be arranged to be close to the vehicle terminal 140 and electrically connected to the vehicle terminal 140 and an external device via a connector or cable.

The external device may include a storage device, a UE, an MP3 player, etc., and the storage device may include a card-type memory and an external hard disk. The user equipment (UE) may be a mobile communication device including a smart phone, a laptop, a tablet, etc. The vehicle 1 may further include a manipulation unit 128 for receiving instructions to operate various functions.

The manipulation unit 128 may be arranged on the head unit 126 and center fascia 125, including at least one mechanical button, such as ON/OFF buttons for operation of various functions, buttons to change settings of various functions, etc. The manipulation unit 128 may send a manipulation signal of a button to a main controller 130e (e.g., see FIG. 5) in the head unit 126 or the vehicle terminal 140.

For example, the manipulation unit 128 may receive an ON or OFF instructions for operation of the vehicle terminal 140 and a selection of at least one function from among a plurality of functions, and may be even able to send the selected function to the vehicle terminal 140. Specifically, the manipulation unit 128 may receive information about a destination and send the information about the destination to the vehicle terminal 140 while the navigation function is selected; receive information about a broadcasting channel and volume and send the information about a broadcasting channel and volume to the vehicle terminal 140 while the DMB function is selected; receive track information and volume information and send the information to the vehicle terminal 140 or the display 130b while the audio function is selected.

The manipulation unit 128 may include a touch panel incorporated into the display of the vehicle terminal 140. The manipulation unit 128 may be displayed on the display of the vehicle terminal 140 in the form of at least one button, and receive information of the location of the button. The manipulation unit 128 may also include a jog dial (not shown) or touch pad for the user to input an instruction to move or select a cursor displayed on the display of the vehicle terminal 140. The manipulation unit 128 may send a signal resulting from manipulation of the jog dial or a signal resulting from touching the touch pad to the vehicle terminal 140. The jog dial or touch pad may be arranged on the center fascia. The manipulation unit 128 may also receive an instruction for automatic track change while the audio function is being performed.

The display 130b may display information about operation of the head unit 126 and display information input to the manipulation unit 128. For example, the display 130b may display the track information and the volume information input by the user while the audio function is performed. The display 130b may display information about the input instruction for automatic track change and information about the automatic channel change being performed, while the audio function is performed.

The vehicle terminal 140 may be detachably installed on the dashboard as well. The vehicle terminal 140 may perform audio, video, navigation, DMB, radio, global positioning system (GPS) reception functions.

The chassis of the vehicle 1 includes a power generating system, a power transfer system, a traveling gear, a steering system, a braking system, a suspension system, a transmission system, a fuel system, front, rear, left, and right wheels, etc.

The vehicle 1 may further include various safety systems for securing safety of the driver and passengers. The safety systems may include an airbag control unit for the purpose of the safety of driver and passengers in case of car crashes, and an Electronic Stability Control (ESC) unit for stabilizing the vehicle's position while the vehicle 1 is accelerating or cornering.

In addition, the vehicle 1 may include detection devices, such as approximation sensors for detecting an obstacle or other vehicle to the sides or behind, a rain sensor for detecting whether it is raining and an amount of rainfall, wheel speed sensors for detecting speed of the front, back, left and right wheels, an acceleration sensor for detecting acceleration of the vehicle 1, an angular speed sensor for detecting steering angle of the vehicle 1, etc.

The vehicle 1 includes an Electronic Control Unit (ECU) for controlling operation of the power generating system, power transfer system, traveling gear, steering system, braking system, suspension system, transmission system, fuel system, various safety systems and detection devices. Furthermore, the vehicle 1 may also include electronic devices, such as a hands-free system, Bluetooth device, a rear camera, a charging system for UE, E-Z pass (hi-pass in Korea) equipment, etc.

The vehicle 1 may further include an engine start button to provide an operation instruction to a start motor (not shown). Specifically, pushing the engine start button drives the start motor, which in turn drives the power generating system, i.e., an engine (not shown).

The vehicle 1 further includes a battery (not shown) electrically connected to a terminal, audio system, indoor lighting system, start motor, and other electronic devices for supplying power. The battery is charged by means of dynamic power of the internal generator or the engine while the vehicle is being driven.

The vehicle 1 may further include a communication device for communication among the internal electronic devices and communication with an external device, such as the UE. The communication device may include a Controller Area Network (CAN) module, a Wireless Fidelity (Wi-Fi) communication module, a USB module, and a Bluetooth communication module. The communication device may further include a broadcasting communication module, such as TPEG, SXM, RDS, etc., for e.g., DMB.

It should be understood that the interior arrangement of the vehicle 1 depicted in FIG. 2 and described above is for demonstration purposes only, and thus should not be treated as limiting the scope of the present disclosure or claims.

Referring now to FIG. 3, the vehicle 1 in accordance with embodiments may include a disc drive 200 for playing e.g., Compact Discs (CDs), Video CDs (VCDs), Digital Versatile Discs (DVDs), etc.

While FIG. 3 shows that the disc drive 200 is arranged inside the lower part of the dashboard 122 of the vehicle 1, the disc drive 200 may be arranged at any place.

The disc drive 200 in accordance with embodiments of the present disclosure may be inserted into the dashboard 122 and hidden from the view of the driver, or may be withdrawn from the dashboard 122 for the driver to be able to insert/withdraw a CD or DVD disc (hereinafter, referred to as an optical disc) therein/therefrom.

The disc drive 200 may be connected to the head unit 126 of the vehicle 1 over a wired or wireless network to share information about a state of the vehicle 1 and about a state of the disc drive 200. For example, the dashboard 122 may include a connector connected to the head unit 126, and the disc drive 200 may be connected to the head unit 126 of the vehicle 1 via a cable connected to the connector.

Figure 4:
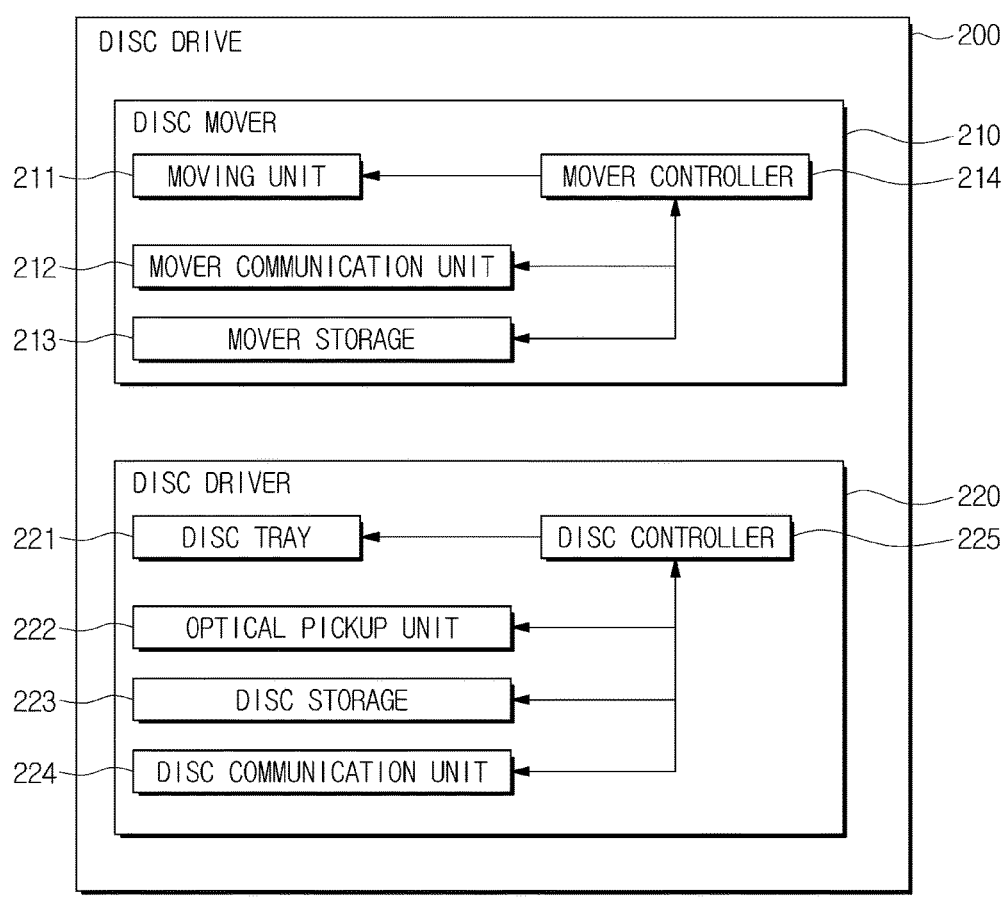
FIG. 4 is a control block diagram of a disc drive, according to embodiments of the present disclosure.

FIG. 4 is a control block diagram of a disc drive, according to embodiments of the present disclosure.

As shown in FIG. 4, the disc drive 200 in accordance with embodiments of the present disclosure may include a disc mover 210 for mechanically moving the disc drive 200, and a disc driver 220, into which or from which an optical disc is inserted or withdrawn and which plays an inserted optical disc.

For example, the disc mover 210 may move the disc drive 200 into or out of the dashboard 233, thus having the disc drive 200 come into or out of the driver's view. The disc mover 210 may include a moving unit 211 that moves according to a control signal from a mover controller 214, a mover communication unit 212 for transmitting/receiving data, a mover storage 213 for storing information about a state of the disc mover 210, and the mover controller 214 for controlling the components of the disc mover 210.

The moving unit 211 is implemented with a driving device including a motor, a shaft, etc., for moving the disc drive 200 up or down, or into or out of the dashboard 122, according to control signals from the mover controller 214.

Herein, moving the disc drive 200 up or down is described as an example, but the moving unit 211 may move the disc drive 200 to the left or right or any other direction depending on the form of how the disc drive 200 is built in. That is, the moving unit 211 may move the disc drive 200 in any first direction or any second direction opposite the first direction.

The mover communication unit 212 may connect the disc mover 210 to the head unit 126 and the disc driver 220 over a wired or wireless network. For example, the mover communication unit 212 may be implemented as a Controller Area Network (CAN) communication module and connected to the head unit 126 via a cable, without being limited thereto, or may be implemented as any other various wired or wireless communication modules.

For instance, the mover communication unit 212 may be connected to the disc driver 220 via the head unit 126, but it is not limited thereto and may be connected directly to the disc driver 220 and share the state information.

The mover storage 213 may store information about a state of the disc mover 210, which is created by the mover controller 214, and information about a state of the head unit 126 or the disc driver 220, which is received through the mover communication unit 212. The mover storage 213 may be a memory for storing various data required to control the disc mover 210, and may be implemented as a separate module from the mover controller 214.

The mover controller 214 may create a control signal to move the moving unit 211 up or down, create information about a state of the disc mover 210, which may then be transmitted through the mover communication unit 212, and control the mover storage 213 to store information about a state of the head unit 126 or a state of the disc driver 220 received through the mover communication unit 212. For example, the mover controller 214 may create a control signal to move the moving unit 211 up or down according to ON or OFF control of a mover control switch 150 of FIG. 3 arranged outside the disc drive 200.

The mover controller 214 may determine a state of the disc drive 200 based on the information about a state of the head unit 126 or disc driver 220, and the information about a state of the disc mover 210, and control the disc mover 210 based on the determination.

Operation of the mover controller 214 may be implemented with a processor. The operation of the mover controller 214 will be described in detail below.

The disc driver 220 may include a disc tray 221 on which an optical disc is safely seated, an optical pickup unit 222 for extracting data from the optical disc safely seated on the disc tray 221, a disc storage 223 for storing information about a state of the optical disc or disc driver 220, a disc communication unit 224 for transmitting or receiving data, and a disc controller 224 for controlling the components of the disc driver 220.

One or more optical discs may be safely seated on the disc tray 221. In case that multiple optical discs are safely seated on the disc tray 221, the disc driver 220 may further include a servo device (not shown) for selecting one of the multiple optical discs safely seated on the disc tray 221. For convenience of explanation, the disc tray 221 having a single optical disc safely seated thereon will be described as an example.

An optical disc may be safely seated on the disc tray 221 by the driver, and the optical disc may come out in response to an eject command of the driver and the driver may withdraw the optical disc.

The optical pickup unit 222 may extract data from the optical disc safely seated on the disc tray 221. In this regard, the disc controller 225 may send the data extracted by the optical pickup unit 222 to the head unit 126 through the disc communication unit 224, or may process the extracted data on its own to create audio and video signals and send the audio and video signals to the head unit 126.

The disc storage 223 may store information about a state of the optical disc or state of the disc driver 220, which is created by the disc controller 225 based on the data extracted from the optical disc. The disc storage 223 may be a memory for storing various data required to control the disc driver 220, and may be implemented as a separate module from the disc controller 225.

The disc communication unit 224 may connect the disc driver 220 to the head unit 126 and the disc mover 210 over a wired or wireless network. For example, the disc communication unit 224 may be implemented as a Universal Serial Bus (USB) communication module and connected to the head unit 126 via a cable, without being limited thereto, or may be implemented as any other various wired or wireless communication modules.

The disc communication unit 224 may be connected to the disc mover 210 via the head unit 126, but it is not limited thereto and may be connected directly to the disc mover 210 and share the state information.

The disc controller 225 may create a signal to withdraw an optical disc from the disc tray 221, a control signal for the optical pickup unit 222 to extract data, and information about a state of the optical disc or disc driver 220, which is to be transmitted through the disc communication unit 212, and control the disc storage 223 to store the information about a state of the head unit 126 or a state of the disc mover 210, which is received through the disc communication unit 224. For example, the disc controller 225 may create a signal to withdraw an optical disc in response to an input through the input unit 130a of the AVN system 130 or through the manipulation unit 128.

The disc controller 225 may determine a state of the disc drive 200 based on the information about a state of the head unit 126 or disc driver 220 and the information about a state of the disc mover 210, and control the disc mover 210 based on the determination.

Operation of the disc controller 225 may be implemented with a processor. The operation of the disc controller 225 will be described in detail below.

As such, the disc drive 200 implemented separately from the head unit 126 may exchange data with the head unit 126 over a wired or wireless network. Components of the vehicle 1 connected to the disc drive 200 will now be described in detail.

Figure 5:
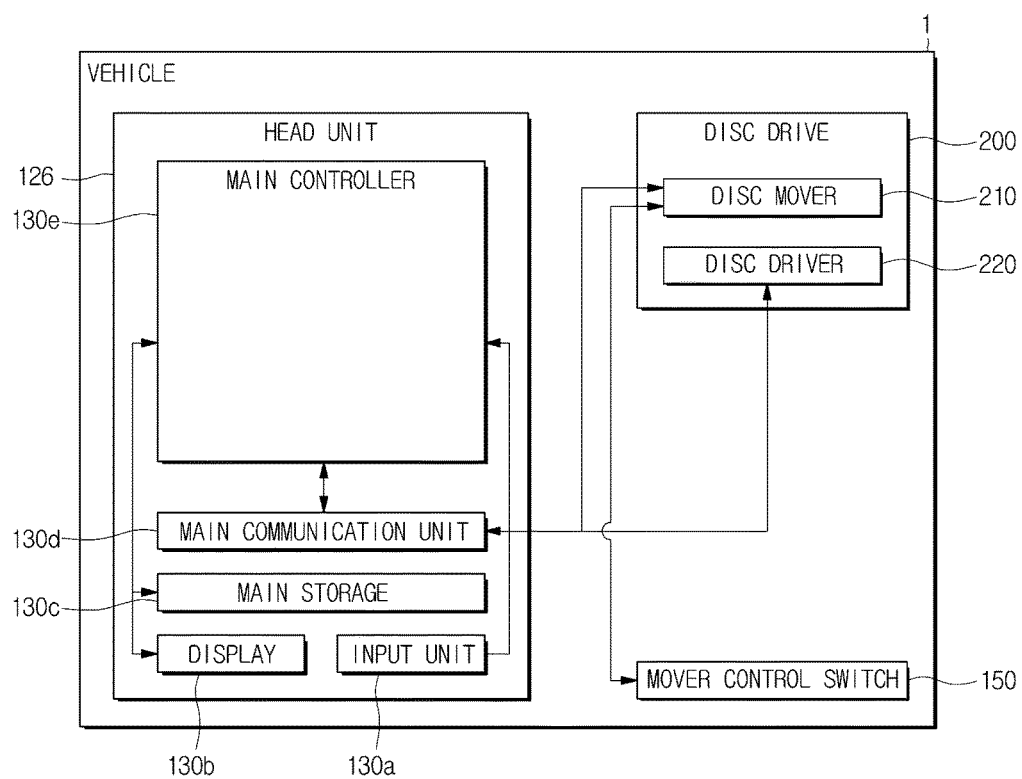
FIG. 5 is a control block diagram of a vehicle, according to embodiments of the present disclosure.

FIG. 5 is a control block diagram of a vehicle, according to embodiments of the present disclosure.

The vehicle 1 in accordance with embodiments of the present disclosure may include the head unit 126 and the disc drive 200, and further include the mover control switch 150 that receives a command to move the disc drive 200.

The head unit 126 may include the input unit 130*a* and the display 130*b* as shown in FIG. 2, and may further include a main storage 130*c*, a main communication unit 130*d* connected to the disc drive 200 over a wired or wireless network, and a main controller 130*e* for controlling the respective components of the head unit 126.

The input unit 130*a* and the display 130*b* were described above, so the further description will be omitted herein.

The main storage 130*c* may store programs and data required for the main controller 130*e* to control the respective components of the head unit 126. The main storage 130*c* may further store information regarding a state of power of the vehicle 1. The main storage 130*c* may be a memory and may be implemented as a separate module from the main controller 130*e*.

The main communication unit 130*d* may connect the head unit 126 to an external device over a wired or wireless network. In embodiments of the present disclosure, the main communication unit 130*d* may be connected to the disc driver 220 and the disc mover 210 over a wired or wireless network. For example, the main communication unit 130*d* may include a USB module and a USB connector to be connected to the disc communication unit 224 of the disc driver 220 via a cable, and include a CAN communication module and a CAN communication connector to be connected to the mover communication unit 212 of the disc mover 210 via a cable, and in addition, may include other various wired or wireless communication modules.

The head unit 126 may serve as a link between the disc mover 210 and the disc driver 220 to exchange state information, but it is not limited thereto and it is also possible that the disc communication unit 224 may be connected directly to the disc mover 210 to exchange the state information.

The main controller 130*e* may create control signals for the respective components of the head unit 126.

In embodiments of the present disclosure, the main controller 130*e* may create state information related to a state of power of the vehicle 1, send the state information to the disc mover 210 and the disc driver 220, forward state information sent from the disc mover 210 to the disc driver 220, and forward state information sent from the disc driver 220 to the disc mover 210. Furthermore, the main controller 130*e* performs various functions of the vehicle 1 based on the state information of the disc mover and disc driver 220. For example, the main controller 130*e* may perform audio and video functions corresponding to the state information of the disc mover 210 and disc driver 220, a GPS function, an air conditioning function, a seat heating function, or a function to communicate with an external device, without being limited thereto.

Operation of the main controller 130*e* may be implemented with a processor. The operation of the main controller 130*e* will be described in detail later.

In the following, for convenience of explanation, the state information of the disc mover 210 created by the mover communication unit 212 of the disc mover 210 will be called first state information, the state information of the optical disc and disc driver 220 created by the disc driver 220 will be called second state information, and the state information related to a state of power of the vehicle 1 created by the head unit 126 will be called third state information.

Figure 6:
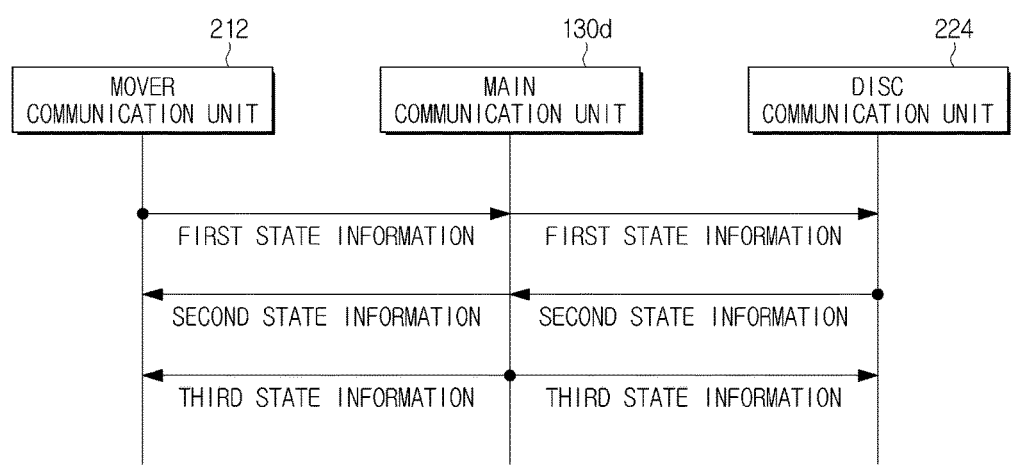
FIG. 6 is a flowchart illustrating transmit paths for the first to third state information.

FIG. 6 is a flowchart illustrating transmit paths for the first to third state information, and FIG. 7 is shows a table representing data included in the first to third state information.

Referring first to FIG. 6, the disc mover 210 in accordance with embodiments of the present disclosure shares the first state information with the head unit 126 and the disc driver 220 by sending the first state information to the main communication unit 130*d* through the mover communication unit 212, and sending the first state information to the disc communication unit 224 through the main communication unit 130*d*.

Referring next to FIG. 7, the first state information is e.g., 3-bit data having at least one of values: value 0 (Default) representing a standby state, values 1 and 2 (Open and Close) representing open position and closed position of the disc driver 220, respectively, value 3 (Error) representing that an error has occurred in the optical disc or disc driver 220, value 7 (Invalid) representing that the first state information is invalid, and values 4 to 6 (Reserved) representing other required states.

For example, when the first state information indicates '1', it may mean that the disc drive 200 has come out of the dashboard 122; when the first state information indicates '2', it may mean that the disc drive 200 is inserted into the dashboard 122. If the disc drive 200 has come out of the dashboard 122, the driver may put or withdraw an optical disc on or from the disc driver 220.

As such, with the first state information sent to the main communication unit 130*d* and the disc communication unit 224, the head unit 126 and the disc driver 220 may determine a current state of the disc mover 210.

Referring back to FIG. 6, the disc driver 220 in accordance with embodiments of the present disclosure shares the second state information with the head unit 126 and the disc mover 210 by sending the second state information to the main communication unit 130*d* through the disc communication unit 224, and sending the second state information to the mover communication unit 212 through the main communication unit 130*d*.

Referring again to FIG. 7, the second state information is e.g., 3-bit data having at least one of values: value 0 (Default) representing a standby state, value 1 (Insert_done) representing that an optical disc in inserted and safely seated in the disc tray 221, value 2 (Loading) representing that data of the optical disc is being extracted, value 3 (Error) representing that there is an error in the optical disc, value 4 (No Disc) representing that the disc tray 221 is empty, value 7 (Invalid) representing that the second state information is invalid, and values 5 and 6 (Reserved) representing other required states.

For example, when the second state information indicates '1', it may mean that an optical disc is inserted and safely seated in the disc driver 220; when the second state information indicates '2', it may mean that the disc pickup unit 222 is extracting data of the optical disc.

As such, with the second state information sent to the main communication unit 130*d* and the mover communication unit 212, the head unit 126 and the disc mover 210 may determine a current state of the disc driver 220 and optical disc safely seated in the disc driver 220.

Referring again to FIG. 6, the main communication unit 130*d* in accordance with an embodiment shares the third state information with the disc mover 210 and the disc driver 220 by sending the third state information to the respective mover communication unit 212 and the disc communication unit 224.

Referring to FIG. 7 once again, the third state information is e.g., 4-bit data having at least one of values: a value (0×0, Key out or Audio OFF) representing that the vehicle 1 or the head unit 126 is powered off, a value (0×2, ACC or Audio ON) representing that the vehicle 1 or the head unit 126 is powered on, and a value (0×F, Invalid) representing that the third state information is invalid.

As such, with the third state information sent to the mover communication unit 212 and the disc communication unit 224, the disc mover 210 and the disc driver 220 may determine a power state of the vehicle 1 or the head unit 126.

Figure 8:
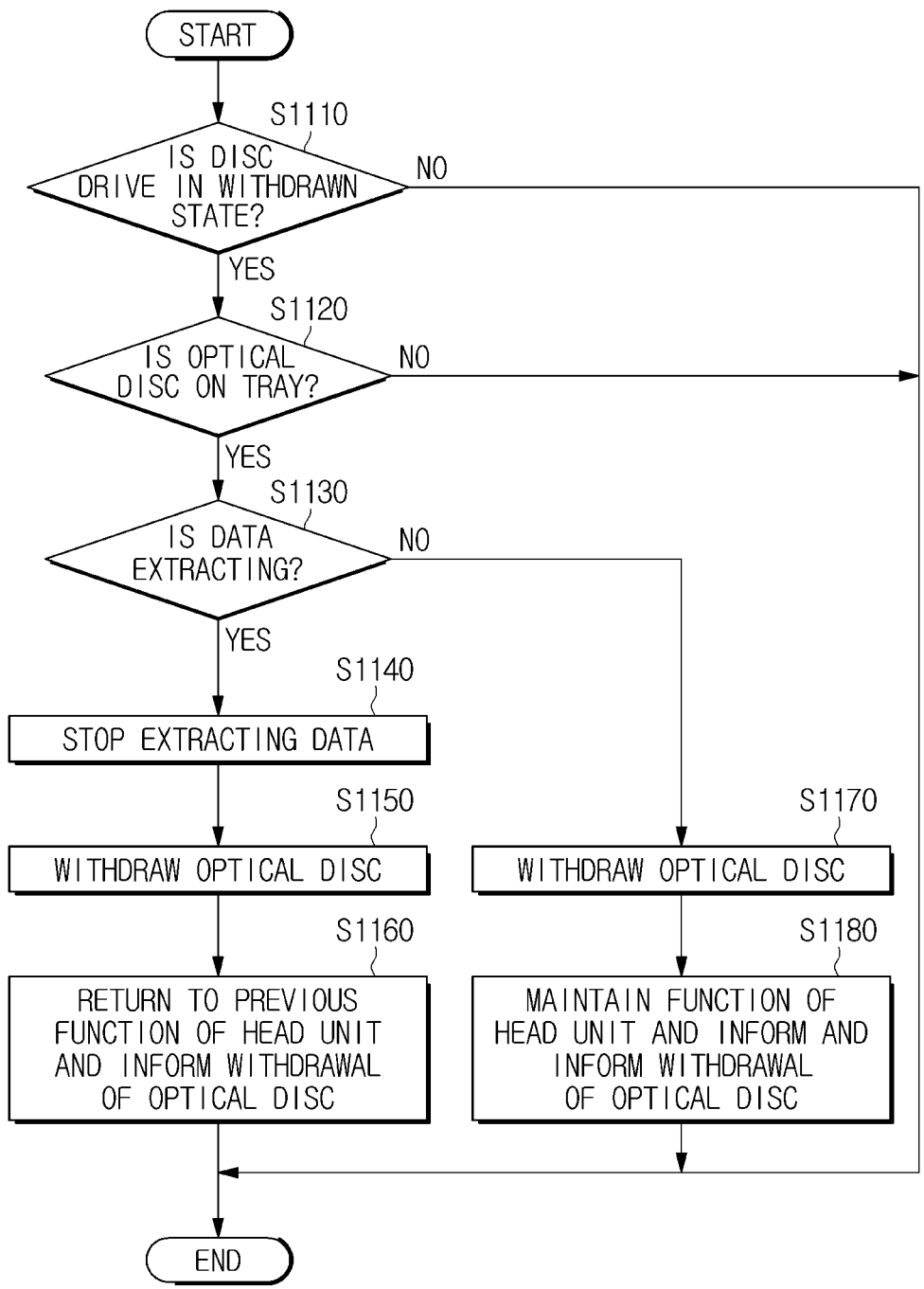
FIG. 8 is a flowchart illustrating a method for controlling a vehicle performed in response to reception of a command from the driver to move a disc drive out of a dashboard.

A method for controlling the vehicle 1 in accordance with embodiments of the present disclosure will be described in detail in connection with FIGS. 8 and 9. FIG. 8 is a flowchart illustrating a method for controlling a vehicle performed in response to reception of a command from the driver to move a disc drive out of a dashboard, and FIG. 9 is a flowchart illustrating a method for controlling a vehicle performed in response to reception of a command from the driver to move a disc drive into a dashboard. The respective components of the vehicle 1 as will be described in connection with FIGS. 8 and 9 are the same as what are described in connection with FIGS. 1 to 5, so the same reference numerals will be used herein.

The method for controlling the vehicle 1 may be performed when the head unit 126 sends the disc mover 210 and the disc driver 220 a value representing that the vehicle 1 or the head unit 126 is powered on ("0×2; ACC or Audio ON" of FIG. 7) as the third state information.

The disc drive 200 may be inserted into or withdrawn from the dashboard 122 by operation of the disc mover 210. If the disc drive 200 has been completely withdrawn from the dashboard 122, it is defined that the disc drive 200 is in a "withdrawn state", and if the disc drive 200 has been completely inserted into the dashboard 122, it is defined that the disc drive 200 is in an "inserted state".

In the case that the disc drive 200 is in the "withdrawn state", the driver may put an optical disc on the disc driver 220 or withdraw an optical disc from the disc driver 220, but in the case that the disc drive 200 is in the "inserted state", the driver may not put an optical disc on the disc driver 220 nor withdraw an optical disc from the disc driver 220 because the disc drive 200 is hidden from the view of the driver.

Referring to FIG. 8, once a command to move the disc drive 200 out of the dashboard 122 is received from the driver, the mover controller 214 of the disc mover 210 in embodiments of the present disclosure determines whether the disc drive 200 is currently in the withdrawn state, in S1110.

The command to move the disc drive 200 out of the dashboard 122 may be input by manipulation of the mover control switch 150 arranged outside the disc drive 200.

If the disc drive 200 is in the withdrawn state in S1110, the mover communication unit 212 of the disc mover 210 sends a value representing that the disc drive 200 is in the withdrawn state ("'1": Open' of FIG. 7) as the first state information to the head unit 126 and the disc driver 220.

Upon reception of the first state information representing that the disc drive 200 is in the withdrawn state, the disc controller 225 of the disc driver 220 determines whether an optical disc is put or safely seated on the disc tray 221, in S1120.

If an optical disc is safely seated on the disc tray 221 in S1120, the disc controller 225 determines whether the optical pickup unit 222 is extracting data from the optical disc, in S1130.

If the optical pickup unit 222 is extracting data from the optical disc, i.e., if the main controller 130*e* is currently performing an audio function or video function, in S1130, the disc controller 225 stops the data extracting operation of the optical pickup unit 222 in S1140 and withdraws the optical disc from the disc tray 221 in S1150.

In this case, the disc driver 220 sends a value representing that the optical disc has been withdrawn from the disc driver 220 ("'4": No Disc' of FIG. 7) as the second state information to the head unit 126 and disc mover 210.

The main controller 130*e* of the head unit 126 then returns to a function that had been provided by the head unit 126 to the driver before it performed the audio or video function, and informs the driver through the display 130*b* that the optical disc has been withdrawn from the disc driver 220, in S1160.

For example, if the main controller 130*e* performs an audio or video function after a GPS function, and then stops extracting data from the optical disc and withdraw the optical disc in S1150 after receiving a command to move the disc drive 200 out of the dashboard 122, the main controller 130*e* returns to the GPS mode.

In the meantime, if the optical pickup unit 222 is not extracting data from the optical disc, i.e., if the main controller 130*e* is not currently performing an audio or video function in S1130, the disc controller 225 withdraws the optical disc from the disc tray 221, in S1170.

In this case, the disc communication unit 224 sends a value representing that the optical disc has been withdrawn from the disc driver 220 ("'4": No Disc' of FIG. 7) as the second state information to the head unit 126 and disc mover 210.

Upon reception of the value representing that the optical disc has been withdrawn from the disc driver 220 as the second state information, the main controller 130*e* of the head unit 126 maintains the function provided to the driver, and informs the driver through the display 130*b* that the optical disc has been withdrawn from the disc driver 220, in S1180.

Referring to FIG. 9, once a command to move the disc drive 200 into the dashboard 122 is received from the driver, the mover controller 214 of the disc mover 210 in embodiments of the present disclosure determines whether the disc drive 200 is currently in the inserted state, in S1210.

The command to move the disc drive 200 into the dashboard 122 may be input by manipulation of the mover control switch 150 arranged outside the disc drive 200.

If the disc drive 200 is in the inserted state in S1210, the mover communication unit 212 of the disc mover 210 sends a value representing that the disc drive 200 is in the inserted state ("'2": Close' of FIG. 7) as the first state information to the head unit 126 and the disc driver 220.

Upon reception of the first state information representing that the disc drive 200 is in the inserted state, the disc controller 225 of the disc driver 220 determines whether an optical disc is safely seated on the disc tray 221, in S1220.

If an optical disc is safely seated on the disc tray 221 in S1220, the disc controller 225 determines a state of the optical disc safely seated on the disc tray 221, in S1230.

If determining that the state of the optical disc is in the normal state in S1230, the disc controller 225 drives the optical pickup unit 222 to extract data from the optical disc, in S1240, and the disc communication unit 224 sends a value representing that the optical pickup unit 222 is extracting data ('"2": Loading' of FIG. 7) as the second state information to the head unit 126 and disc mover 210.

In this case, the disc controller 225 may create audio and video signals based on the data extracted from the optical disc, and send the audio and video signals to the head unit 126 through the disc communication unit 224.

Upon reception of the value representing that the optical pickup unit 222 is extracting data as the second state information, the main controller 130e of the head unit 126 provides an audio or video function based on the received audio and video signals, in S250.

If the disc controller 225 determines that the optical disc is not in the normal state in S1230, the disc communication unit 224 sends a value representing that the optical disc or the disc driver 220 has an error ('"3": Error' of FIG. 7) as the second state information to the head unit 126 and the disc mover 210.

Upon reception of the value representing that the optical disc or the disc driver 220 has an error as the second state information, the main controller 130e of the head unit 126 returns to a function that had been provided for the driver before it performed the audio or video function, and informs the driver through the display 130b that the optical disc or the disc driver 220 has an error, in S1260.

While it was described in the aforementioned embodiments that a value representing that the disc drive 200 is in the withdrawn state or a value representing that the disc drive 200 is in the inserted state as the first state information, a value representing that the optical pickup unit 222 is extracting data as the second state information, and a value representing that the vehicle 1 or the head unit 126 is powered on as the third state information are only shared, other various first to third state information may be shared between the disc mover 210, the disc driver 220, and the head unit 126.

The embodiments of the disc drive 200, the vehicle 1 having the same, and the method for controlling the vehicle 1 are only by way of example, and the present disclosure is not limited to the embodiments. Thus, according to embodiments of the present disclosure, a disc drive or each of the components of a vehicle is controlled based on a state of a disc driver and a state of a disc mover, thereby preventing an error of operation inconsistency between the disc mover and the disc driver and preventing damages to optical discs.

Several embodiments have been described, but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes.

What is claimed is:

1. A disc drive comprising:
a disc driver that plays a safely seated optical disc, the disc driver including a disc controller that controls respective components of the disc driver and an optical pickup unit that extracts data from the safely seated optical disc; and
a disc mover that moves the disc driver, wherein
the disc driver and the disc mover are configured to share information of their respective states with each other,
the disc driver is configured to create information indicating at least one of: whether an optical disc is safely seated, whether data is being extracted from a safety seated optical disc, and whether a safely seated optical disc is normal, and
the disc controller is configured to determine, based on the respective states of the disc driver and the disc mover, at least one of: whether to stop a data extracting operation of the optical pickup unit and whether to withdraw the optical disc.

2. The disc drive of claim 1,
wherein the disc driver and the disc mover are configured to share information of their respective states with each other through a head unit of a vehicle.

3. The disc drive of claim 1,
wherein the disc mover is configured to generate first state information indicating whether the disc drive is in an inserted state or in a withdrawn state.

4. The disc drive of claim 1,
wherein the disc mover is configured to generate first state information indicating whether an error has occurred in the disc mover.

5. The disc drive of claim 2,
wherein the disc driver is configured to generate second state information indicating at least one of whether the optical disc is safely seated in the disc driver, whether data is being extracted from the safely seated optical disc, and whether the safely seated optical disc is operating normally.

6. The disc drive of claim 1,
wherein the disc mover is configured to move the disc driver in a first direction or a second direction opposite the first direction.

7. The disc drive of claim 1,
wherein the disc mover is configured to insert the disc driver into a dashboard of a vehicle or withdraw the disc driver out of the dashboard.

8. The disc drive of claim 2,
wherein the disc mover is connected to the head unit over a Controller Area Network (CAN) communication network.

9. The disc drive of claim 2,
wherein the disc driver is connected to the head unit over a Universal Serial Bus (USB) communication network.

10. The disc drive of claim 1,
wherein the disc driver comprises:
a disc tray on which the optical disc is safely seated; and
a disc communication unit that sends information indicating a state of the safely seated optical disc or the disc driver.

* * * * *